(12) United States Patent
Ito et al.

(10) Patent No.: US 7,822,931 B2
(45) Date of Patent: Oct. 26, 2010

(54) FILE STORAGE DEVICE, HOST APPARATUS, METHOD FOR FORMATTING NONVOLATILE SEMICONDUCTOR MEMORY, AND METHOD OF WRITING DATA IN NONVOLATILE SEMICONDUCTOR MEMORY

(75) Inventors: Takafumi Ito, Ome (JP); Hiroyuki Sakamoto, Ome (JP)

(73) Assignee: Kabushiki Kaisha Toshiba, Tokyo (JP)

(*) Notice: Subject to any disclaimer, the term of this patent is extended or adjusted under 35 U.S.C. 154(b) by 401 days.

(21) Appl. No.: 11/724,230

(22) Filed: Mar. 15, 2007

(65) Prior Publication Data

US 2007/0226404 A1    Sep. 27, 2007

Related U.S. Application Data

(60) Provisional application No. PCT/JP2005/017433, filed on Sep. 15, 2005.

(30) Foreign Application Priority Data

Sep. 15, 2004   (JP) .............................. 2004-268723

(51) Int. Cl.
   *G06F 13/00* (2006.01)
(52) U.S. Cl. ................... 711/156; 711/103; 711/171
(58) Field of Classification Search ................. 711/103, 711/156, 159
   See application file for complete search history.

(56) References Cited

U.S. PATENT DOCUMENTS

| | | | | |
|---|---|---|---|---|
| 5,627,783 | A * | 5/1997 | Miyauchi | ............... 365/185.33 |
| 5,887,198 | A | 3/1999 | Houlberg et al. | ............... 710/62 |
| 6,978,342 | B1 * | 12/2005 | Estakhri et al. | ............. 711/103 |
| 7,107,389 | B2 * | 9/2006 | Inagaki et al. | ............... 711/103 |
| 2006/0015731 | A1 * | 1/2006 | Lakshmi Narayanan | .... 713/176 |
| 2006/0224819 | A1 | 10/2006 | Ito | .............................. 711/103 |

FOREIGN PATENT DOCUMENTS

| | | |
|---|---|---|
| CN | 1516834 A | 7/2004 |
| CN | 1833229 A | 9/2006 |
| EP | 1 043 729 A | 10/2000 |
| EP | 1 653 362 A | 5/2006 |
| JP | 07-079403 | 3/1995 |
| JP | 07-105053 | 4/1995 |
| JP | 7-141479 | 6/1995 |
| JP | 08-076942 | 3/1996 |
| JP | 09-252447 | 9/1997 |
| JP | 2003-308241 | 10/2003 |
| WO | WO 2005/015406 A1 | 2/2005 |

OTHER PUBLICATIONS

SanDisk Standard Grade—CompactFlash and PC Card—XP-002382405, Product Manual, Version 1.5, Document No. 80-36-00267, Mar. 2004, SanDisk Corporation, pp. i-vi and p. 85.
U.S. Appl. No. 12/403,815, filed Mar. 13, 2009, Ito.

* cited by examiner

*Primary Examiner*—Reba I Elmore
(74) *Attorney, Agent, or Firm*—Oblon, Spivak, McClelland, Maier & Neustadt, L.L.P.

(57) ABSTRACT

A file storage device includes a nonvolatile semiconductor memory which is accessed by a file system of a host apparatus. The nonvolatile semiconductor memory has a user data area. The user data area is accessible by the file system. Device information indicates that the nonvolatile semiconductor memory is a nonvolatile semiconductor memory and is written in the user data area.

19 Claims, 9 Drawing Sheets

[Disc Parameter of FAT 32]

| Offset | Size (bytes) | Contents | Value |
|---|---|---|---|
| 3 | 8 | OEM name | |
| 0B | 2 | Sector size | 512 |
| 0D | 1 | Sector number / cluster | |
| 0E | 2 | Reserved sector number | |
| 10 | 1 | Number of FATs | |
| 11 | 4 | (Reserved) | |
| 15 | 1 | Media descriptor | |
| 16 | 2 | Sector number / FAT | |
| 18 | 2 | Sector number / track | |
| 1A | 2 | Head number | |
| 1C | 4 | Hidden sector number | |
| 20 | 4 | Total big sector number | |
| 24 | 4 | Big sector number / FAT | |
| 28 | 2 | Extended flag | |
| 2A | 2 | File system version | |
| 2C | 4 | First cluster of route | |
| 30 | 2 | File system information sector position | |
| 32 | 2 | Backup boot sector position | 6 |
| 34 | 12 | (Reserved) | |
| 40 | 1 | Drive ID | |
| 41 | 1 | (Reserved for NT) | |
| 42 | 1 | Extended boot sign | |
| 43 | 4 | Serial number | |
| 47 | 11 | Volume name | |
| 52 | 8 | File system type (FDF) | FAT32 |
| 60 | 1 | Flash device flag (FDF) | |
| 61 | 2 | Erasure block size (X512 byte) (EBS) | |
| 62 | 2 | Write page size (X512 byte) (PS) | |
| 63 | 2 | RU size (kB) | |
| 66 | 1 | AU size (X64 kB) | |
| 67 | 1 | Write performance Pw (MB / sec) | |
| 68 | 1 | Move performance Pm (MB / sec) | |

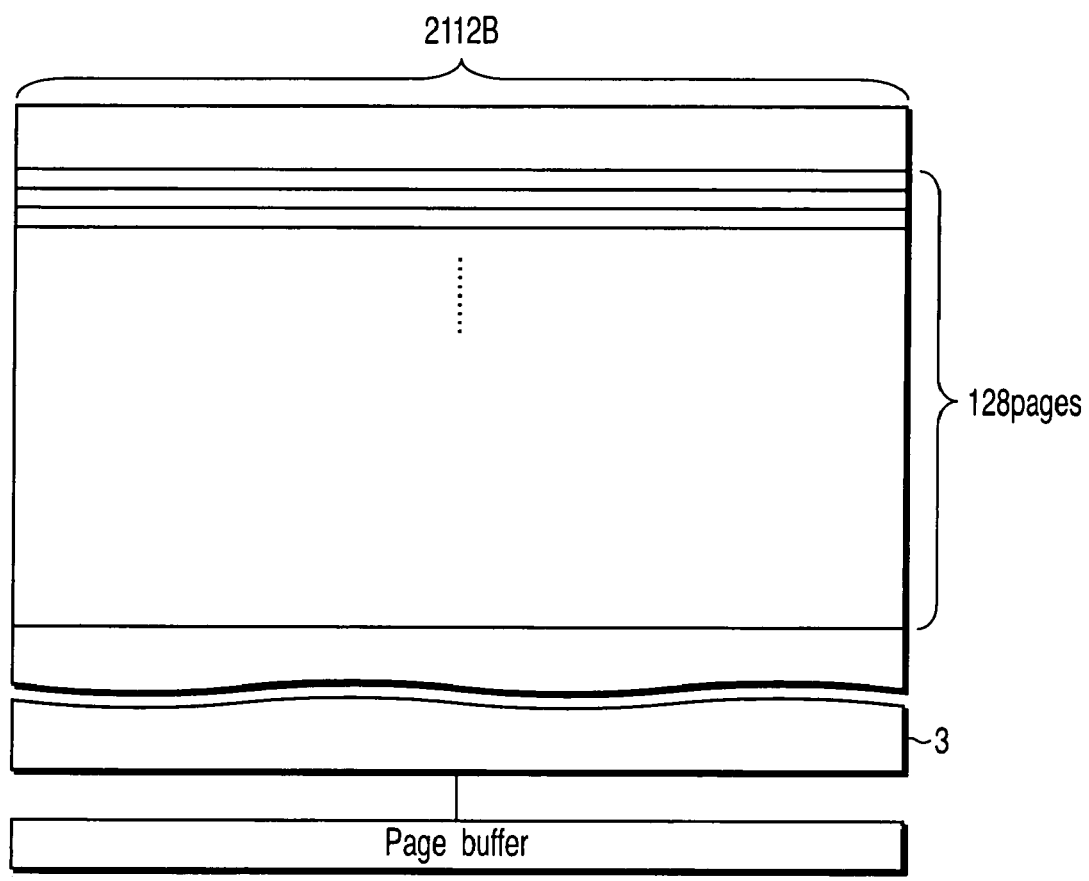
F I G. 3

[Disc Parameter of FAT 32]

| Offset | Size (bytes) | Contents | Value |
|---|---|---|---|
| 3 | 8 | OEM name | |
| 0B | 2 | Sector size | 512 |
| 0D | 1 | Sector number / cluster | |
| 0E | 2 | Reserved sector number | |
| 10 | 1 | Number of FATs, | |
| 11 | 4 | (Reserved) | |
| 15 | 1 | Media descriptor | |
| 16 | 2 | Sector number / FAT | |
| 18 | 2 | Sector number / track | |
| 1A | 2 | Head number . | |
| 1C | 4 | Hidden sector number | |
| 20 | 4 | Total big sector number | |
| 24 | 4 | Big sector number / FAT | |
| 28 | 2 | Extended flag | |
| 2A | 2 | File system version | |
| 2C | 4 | First cluster of route | |
| 30 | 2 | File system information sector position | |
| 32 | 2 | Backup boot sector position | 6 |
| 34 | 12 | (Reserved) | |
| 40 | 1 | Drive ID | |
| 41 | 1 | (Reserved for NT) | |
| 42 | 1 | Extended boot sign | |
| 43 | 4 | Serial number | |
| 47 | 11 | Volume name | |
| 52 | 8 | File system type | FAT32 |
| 60 | 1 | Flash device flag (FDF) | |
| 61 | 2 | Erasure block size (×512 byte) (EBS) | |
| 62 | 2 | Write page size (×512 byte) (PS) | |
| 63 | 2 | RU size (kB) | |
| 65 | 2 | AU size (×64 kB) | |
| 67 | 1 | Write performance Pw (MB / sec) | |
| 68 | 1 | Move performance Pm (MB / sec) | |

F I G. 4

FILE STORAGE DEVICE, HOST APPARATUS, METHOD FOR FORMATTING NONVOLATILE SEMICONDUCTOR MEMORY, AND METHOD OF WRITING DATA IN NONVOLATILE SEMICONDUCTOR MEMORY

CROSS-REFERENCE TO RELATED APPLICATIONS

This is a Continuation Application of PCT Application No. PCT/JP2005/017433, filed Sep. 15, 2005, which was published under PCT Article 21(2) in Japanese.

This application is based upon and claims the benefit of priority from prior Japanese Patent Application No. 2004-268723, filed Sep. 15, 2004, the entire contents of which are incorporated herein by reference.

BACKGROUND OF THE INVENTION

1. Field of the Invention

The present invention relates to a method of controlling a nonvolatile semiconductor memory, particularly to a method of controlling a nonvolatile semiconductor memory having a predetermined size of a block to be erased.

2. Description of the Related Art

There has been used a memory card using a flash memory (nonvolatile semiconductor memory) as a recording medium of music data or video data. A FAT file system, which allocates data to recordable areas regardless of the address of the recordable areas, is used as a file system of the memory card. Jpn. Pat. Appln. KOKAI Publication No. 7-141479 discloses that FAT file system is adopted in the file system for the flash memory.

NAND Flash™ memory may be typically used as a example of the flash memory for use in the memory card. In the NAND Flash™ memory, data can be erased only in block unit basis. Thus, to rewrite only a part of the data stored in a block, it is necessary to write a new write data to a new erased block and to copy data, which are not to be rewritten, from the old block containing the old data (that are to be changed to new data) to the new block. This process is called "move accompanying write (involved data copy)". The move accompanying write involves an operation of copying data that is not to be rewritten. Consequently, frequent move accompanying write operations drastically increase overhead.

In the FAT file system, the rewriting of FAT data occurs every time cluster data of a file is rewritten. Therefore, when the FAT file system is adopted for the file managing the NAND Flash™ memory, every time the cluster data is rewritten, the moving write occurs, and a file rewriting speed drops.

BRIEF SUMMARY OF THE INVENTION

According to a first aspect of the present invention, there is provided a file storage device comprising a nonvolatile semiconductor memory which is accessed by a file system of a host apparatus, the nonvolatile semiconductor memory having a user data area which is accessible by the file system and in which device information indicating that the nonvolatile semiconductor memory is a nonvolatile semiconductor memory is written.

According to a second aspect of the present invention, there is provided a host apparatus into which a file storage device having a nonvolatile semiconductor memory whose data is erased by erasure block is inserted, the nonvolatile semiconductor device having a user data area which is accessible by a file system which manages data of the nonvolatile semiconductor memory, the host apparatus logically formatting the nonvolatile semiconductor memory in accordance with the file system, reading information of a size of the erasure block from the file storage device, and writing a block size information which indicates a size of the erasure block into the user data area during logical format.

According to a third aspect of the present invention, there is provided a method of formatting a nonvolatile semiconductor memory in which data is written by write page and erased by erasure block and which has a user data area accessible by a file system, the method comprising: reading information of a size of the erasure block from the nonvolatile semiconductor memory; and writing a block size information which indicates the size of the erasure block in the user data area in accordance with the file system.

According to a fourth aspect of the present invention, there is provided a method of writing data in a nonvolatile semiconductor memory in which data is erased by erasure block which comprises write areas and in which erasure block size information indicating a size of the erasure block is stored, the method comprising: reading the erasure block size information; and writing data in the write areas in accordance with the erasure block size information.

BRIEF DESCRIPTION OF THE SEVERAL VIEWS OF THE DRAWING

FIG. 3 is a diagram showing a data arrangement of a flash memory according to the embodiment of the present invention;

FIG. 4 is a diagram showing a parameter in a BPB according to the embodiment of the present invention;

DETAILED DESCRIPTION OF THE INVENTION

An embodiment of the present invention will be described hereinafter with reference to the drawings.

[1] Configuration

Figure 1:
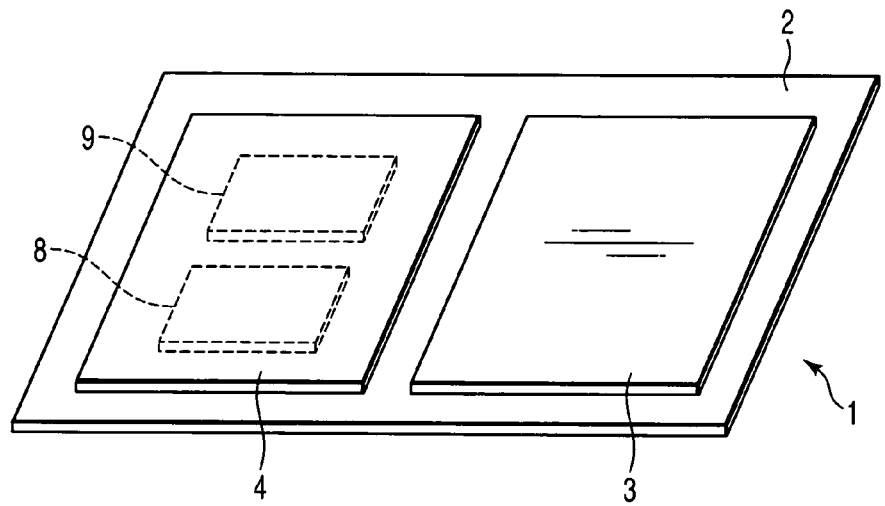
FIG. 1 is a perspective view schematically showing configurations of devices mounted in a memory card according to an embodiment of the present invention.

FIG. 1 is a perspective view schematically showing the configuration of devices mounted in a memory card according to an embodiment of the present invention.

A memory card 1 has a printed circuit board (PCB) 2, and a NAND type flash memory 3 and a controller 4 which are arranged on the PCB 2. Functional blocks such as a central processing unit (CPU) 8 and a read-only memory (ROM) 9 are mounted in the controller 4. These devices will be described later in detail.

The NAND type flash memory (referred to as a flash memory below) 3 may be a binary memory that stores 1-bit information in one memory cell or a multivalued memory that stores 2-or-more-bit information in one memory cell. In contrast to the example shown in FIG. 1, the flash memory 3 and the controller 4 may be arranged on the same large-scale integration (LSI) substrate.

Figure 2:
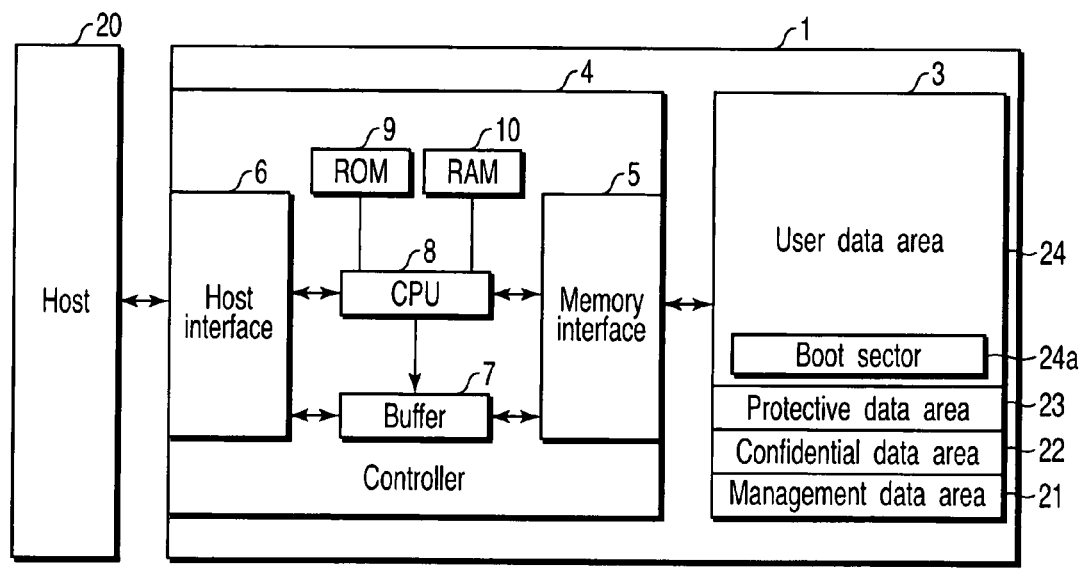
FIG. 2 is a block diagram showing a constitution including a host apparatus and the memory card according to the embodiment of the present invention.

FIG. 2 is a block diagram showing a configuration including a host and the memory card. Elements common to FIGS. 1 and 2 are denoted by the same reference numerals.

The host (referred to as a host below) 20 comprises hardware and software (system) used to make accesses to the inserted memory card 1.

When connected to the host 20, the memory card 1 is supplied with power to operate and execute a process corresponding to an access from the host 20. The memory card 1 has the NAND type flash memory 3 and controller 4 as previously described.

The flash memory 3 is a nonvolatile semiconductor memory for which the size of each erase unit (block) is specified as 256 kB and which writes and reads, for example, every 16-kB data. The flash memory 3 is manufactured using, for example, a 0.09-μm process technique. That is, a design rule for the flash memory 3 is less than 0.1 μm.

The controller 4 has a function for managing the internal physical state of the flash memory 3 (the physical address and ordinal number of sector address data in the flash memory 3 or what block is in an erased state). In addition to CPU 8 and ROM 9, a memory interface section 5, a host interface section 6, a buffer 7, and random access memory (RAM) 10 are mounted in the controller 4.

The memory interface section 5 executes an interface process between the controller 4 and the flash memory 3. The host interface section 6 executes an interface process between the controller 4 and the host 20.

The buffer 7 temporarily stores a fixed amount of data (for example, one page) when data transmitted by the host 20 is written to the flash memory 3 and when data read from the flash memory 3 is transmitted to the host 20.

The CPU 8 is responsible for operations of the whole memory card 1. When, for example, the memory card 1 is powered on, the CPU 8 loads firmware (control program described later) stored in ROM 9, into RAM 10 to execute a predetermined process. In accordance with a control program, CPU 8 creates various tables (described later) on RAM 10 and receives a write command, a read command, and an erase command from the host 20 to execute a predetermined process on the flash memory 3 or to control a data transfer process through the buffer 7.

ROM 9 stores, for example, control programs controlled by CPU 8. RAM 10 is used as a work area for CPU 8 to store control programs and various tables.

FIG. 3 is a diagram showing a flash memory (that is, the NAND type flash memory in the memory card 1) and a data arrangement. Each page (recording unit area) in the flash memory 3 has 2112 B (512 B of data storage section×4+10 B of redundant section×4+24 B of management data storage section). One erase unit (that is, 256 kB+8 kB) is composed of 128 pages. In the description below, for convenience, the erase unit of the flash memory is 256 kB.

Further, the flash memory 3 has a page buffer used to input and output data to and from the flash memory 3. The page buffer has a storage capacity of 2112 B (2048 B+64 B). During a data write operation or the like, the page buffer inputs or outputs data to or from the flash memory in one page unit, which corresponds to the storage capacity of the page memory.

To provide a practically effective memory card, the flash memory 3, shown in FIG. 3, desirably has a storage capacity of at least 1 Gbit. If the flash memory 3 has a storage capacity of, for example, 1 Gbit, it has 512 256-kB blocks.

Although FIG. 3 illustrates that the erase unit is a 256-kB block, it is effective in a practical sense to construct the flash memory whose erase unit is, for example, a 16-kB block. In this case, each page has 528 B (512 B of data storage section+ 16 B of redundant section). One erase unit (that is, 16 kB+0.5 kB (k is 1024) corresponds to 32 pages.

Regions of the flash memory in which data is written are classified into areas according to saved data. The flash memory 3 has a user data area 24, a management data area 21, a confidential data area 22, and a protective data area 23 as areas in which data is written.

The user data area 24 is an area that the file system in the host 20 can freely access and stores user data.

The protective data area 23 stores important data and can be accessed only if the host 20 is validated through the mutual authentication between the memory card 1 and the host 20 connected to the memory card 1.

The management data area 21 mainly stores management information on the memory card 1 and card information on the memory card 1 such as security information and a media ID.

The confidential data area 22 is an area to which key information used for ciphering and confidential data used for authentication are saved and which can be accessed by the host 20.

When a host 20 formats a storage medium (flash memory 3, etc.) of a storage device (memory card 1, etc.), the host 20 (file system) writes physical parameters (attribute) of a storage medium as a part of a BIOS parameter block (BPB). The BPB is data used for management, is written in a boot sector of the storage medium and is used by the file system. The file system reads the BPB at a boot, and recognizes the parameters of the storage medium. In the memory card 1 of FIG. 2, the BPB is written in a boot sector 24a in a user data area 24.

FIG. 4 shows the parameters in the BPB according to one embodiment of the present invention. FIG. 4 shows the BPB when the file system is a FAT 32. As the BPB, there are written the parameters of an OEM name, sector size, sector number/ cluster, reserved sector number, the number of FATs, media descriptor, sector number/FAT, sector number/track, head number, hidden sector number, total big sector number, big sector number/FAT, extended flag, file system version, first cluster of a route, file system information sector position, backup boot sector position, drive ID, extended boot sign, serial number, volume name, file system type, flash device flag (FDF), erasure block size (EBS), write page size, recording unit (RU) size, allocation unit (AU) size, write performance Pw, and data move performance Pm.

The flash device flag, the erasure block size, the write page size, RU size, AU size, write performance Pw, and data move performance Pm are not written in a conventional BPB. The flash device flag indicates whether or not the storage medium which stores the parameter is a flash memory device having the erasure block and write page sizes. For example, when the flash device flag is "0", it is indicated that the storage medium is not a flash memory device (floppy (registered trademark) disc, hard disk, etc.). When the flash device flag is "1", it is indicated that the storage medium is the flash memory device having the erasure block and write page sizes.

The erasure block size, when the storage medium is the flash memory device, shows the size of the erasure block, for example, by 512 B. In an SD™ memory card using a NAND Flash™ memory whose erasure block size is 512 kB, this field has a value of 1024.

The write page size, when the storage medium is the flash memory device, shows the page size, for example, by 512 B. In an SD™ memory card using a NAND Flash™ memory whose page size is 2 kB, this field has a value of 4.

The definition of RU size, AU size, write performance Pw, and data move performance Pm will be described later.

[2] Operation when the Host Formats the Memory Card

Figure 5:
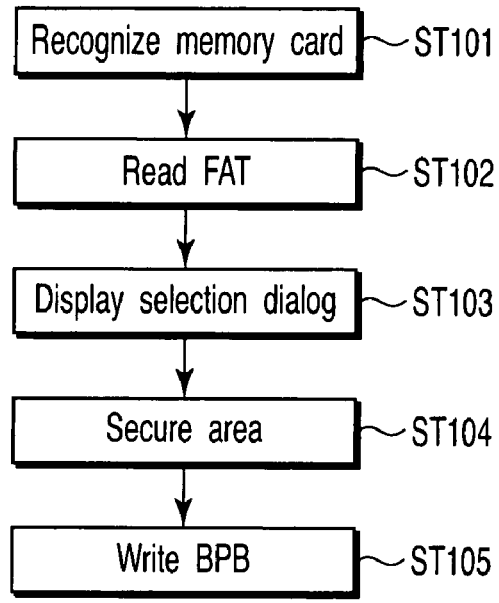
FIG. 5 is a flowchart showing an operation at a time when a host formats the memory card according to the embodiment of the present invention.

An operation when the host 20 formats the memory card will be described with reference to FIG. 5.

When the memory card 1 is inserted in a slot of the host 20, the host 20 recognizes that the memory card 1 has been inserted (step ST101).

Next, the host 20 reads the management data which the FAT file system uses from the memory card 1 (step ST102). If the management data for the FAT file system is not read, that is, the flash memory 3 is not formatted, the host 20 displays in a display disposed in the host 20 a selection dialog indicating whether or not to format the flash memory 3 (step ST103). When a user selects the formatting of the flash memory 3, the host 20 starts formatting the flash memory 3. Note that even when the flash memory 3 is formatted, the user can command the host 20 to format the memory.

Next, the host 20 secures a boot sector, a directory area, a FAT area, and a data area in a user data area 34 of the flash memory 3 (step ST104).

Next, the host 20 writes the BPB in the boot sector (step ST105). The same operation as the conventional technique is performed to acquire the parameters of the OEM name, sector size, sector number/cluster, reserved sector number, the number of FATs, media descriptor, sector number/FAT, sector number/track, head number, hidden sector number, total big sector number, big sector number/FAT, extended flag, file system version, first cluster of the route, file system information sector position, backup boot sector position, drive ID, extended boot sign, serial number, volume name, and file system type.

A method of acquiring the parameters of the flash device flag (FDF), the erasure block size (EBS), the write page size, the write performance Pw, and the data move performance Pm now will be described.

The host 20 sends to the memory card 1 a command for obtaining information of the flash memory 3 in the memory card 1. This command is prepared according to a standard in when the memory card 1 is the SD™ memory card.

When the host receives the information of the flash memory 3 from the memory card 1, the host 20 takes the information of the erasure block size, the write page size, the write performance Pw, and the data move performance Pm from the received information. The host 20 uses the acquired information to write the erasure block size, the write page size, the write performance Pw, and the data move performance Pm as a part of the BPB in the boot sector.

If a storage device does not support any command to send the host 20 the erasure block size, the write page size of the memory, the write performance Pw, and the data move performance Pm, the user of format software manually sets these values to the host 20, and the format software sets the value to the BPB.

How to set the parameters of the RU size and the AU size now will be described. RU and AU are idea which the host 20 uses to execute management on the flash memory 3, such as writing data. Therefore, the sizes of RU and AU are already set in the host 20 and the host 20 knows these values. The host 20 set these values to the BPB when it formats the flash memory 3.

[3] File Writing Operation

Figure 6:
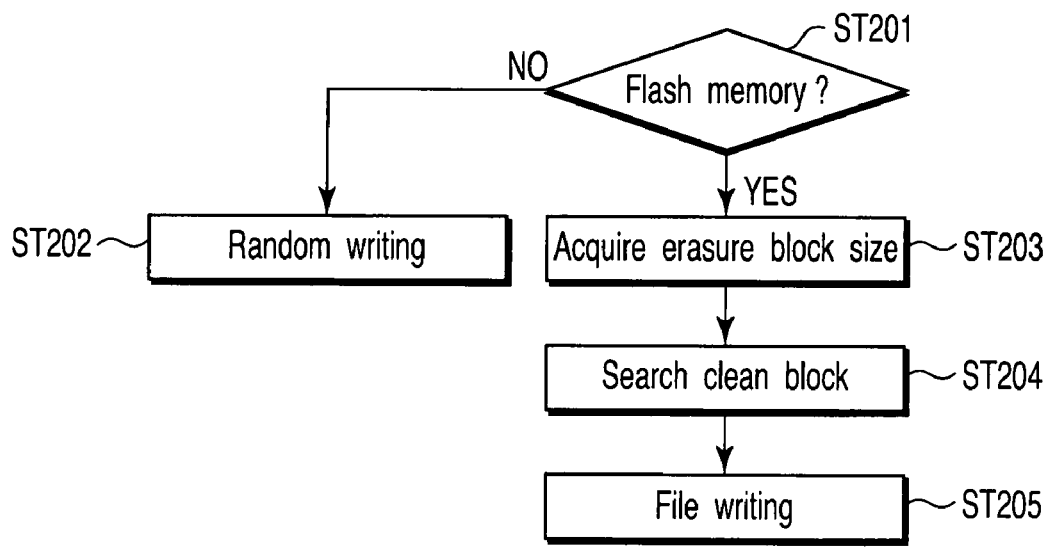
FIG. 6 is a flowchart showing a procedure of writing process of a file according to the embodiment of the present invention.

File write process will be described with reference to FIG. 6.

The host 20 refers to the flash device flag (FDF) of the BPB, and checks whether or not the storage medium is a flash device (step ST201).

When the storage medium is not the flash device, the host 20 (file system software in the host 20) performs random write processing in the same manner as in the usual floppy (registered trademark) disc or the hard disk without taking erasure block size or the like into consideration (step ST202).

When the storage medium is the flash memory, the host 20 performs the file writing in the following method.

The host 20 acquires the information of the erasure block size and the write page size of the BPB (step ST203).

The host 20 searches the FAT by erasure block size, which the BPB teaches, to search for a block (clean block) which does not include any used cluster (step ST204).

The host 20 performs the file writing while preferentially allocating file data to the clean block (step ST205). During writing, the file system preferably writes the file data by a data size which is integer times as large as the write page size described in the BPB. Accordingly, it is possible to prevent the file system from random-page-writing in the erasure block, and to improve a data write speed.

[4] File Writing Operation which Enables Recovery

Next, there will be described a writing method and a recovery method which enables to recover the file when writing of a stream file in real time is not completed in the FAT file system.

Figure 7:
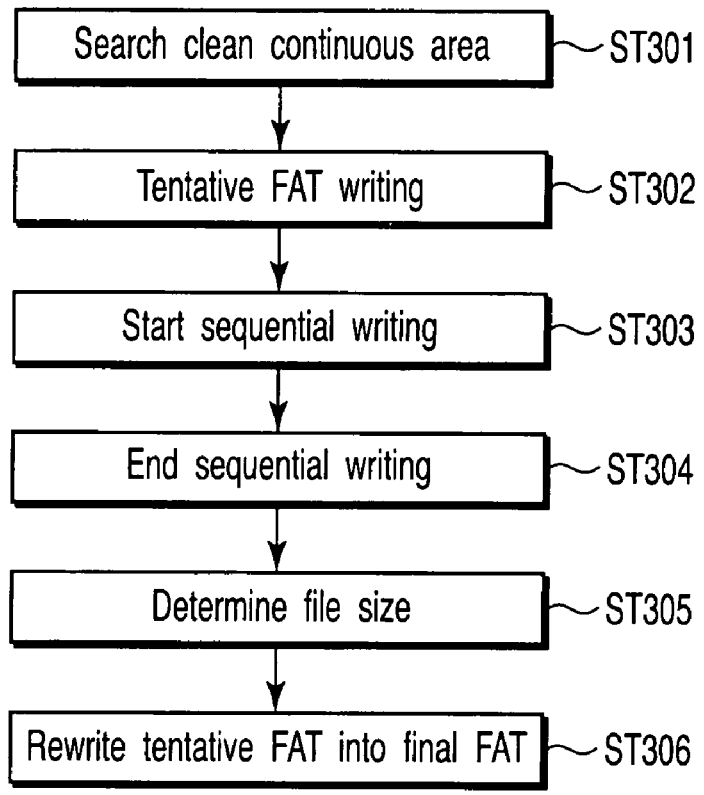
FIG. 7 is a flowchart showing the procedure of the writing process according to the embodiment of the present invention.

The host 20 writes the file in the following procedure during the file writing. A Procedure of write processing will be described with reference to a flowchart of FIG. 7.

The host 20 searches the largest one (largest continuous area) from areas which only contain continuous clean blocks based on the erasure block size and the FAT registered in the BPB (step ST301).

When the size of the searched largest continuous area is large enough for writing the stream file, it is determined that the stream file be written into the largest continuous area, and moreover a tentative FAT for the stream file to be written is written beforehand (step ST302).

If the size of the largest continuous area is not large enough for writing the stream file, a conversion table may be changed to make the logical addresses of blank areas continuous in order to secure area for writing the stream file.

The host 20 successively writes a file entity from a lower address sectors to higher ones (step ST303). During the writing, no FAT is updated. This can prevent a write speed drop which is accompanied by FAT update. At the writing time, the memory card 1 records in redundant area in a page the flag which indicates that data has been written in the page.

When the stream writing in real time ends (step ST304), the file size is determined (step ST305). The tentative FAT is rewritten into a final FAT based on the determined file size and then writing file is closed (step ST306).

Figure 8:
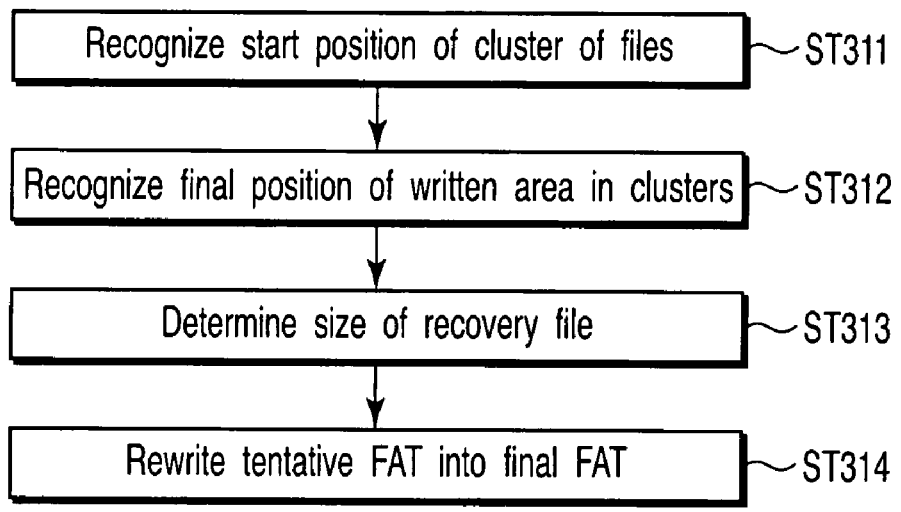
FIG. 8 is a flowchart showing a procedure of recovery process according to the embodiment of the present invention.

When the file writing is not completed because of some kind or another factor (hardware trouble, etc.), that is, when the writing of the final FAT is not completed, the host 20 recovers the file in the following procedure. The procedure of recovery processing will be described with reference to FIG. 8.

A start position of the cluster of the file entity is recognized in accordance with the tentative FAT (step ST311).

The host 20 recognizes a final position of the written area in accordance with the written/non-written flag (step ST312).

The host determines as a size of a recovery file an area ranging from the cluster start position to the final write position recognized in the step ST312 (step ST313).

The tentative FAT is updated into a formal FAT based on the determined file size (step ST314).

According to the above-described write processing and recovery processing, the file can be recovered up to at least a recorded position even if writing of the stream file in real time, such as dynamic picture photographing by a video camera, is not completed because of a hardware trouble of a host apparatus or the like, and a file structure becomes incomplete.

Note that defragmentation process may be performed before the step ST301 to secure the continuous area for writing the stream file. When the defragmentation process is performed, an efficiency of write control is improved.

[5] Performance Parameter

The file system in the host 20 can calculate a file writing parameter using the RU size, AU size, write performance Pw, and data move performance Pm. These performance parameters and a calculation using the performance parameter will now be described. The SD™ memory card will be described as an example of the memory card 1.

[5-1] Definition of Performance Curve

[5-1-1] Division of Memory Area

First, division of memory area by the host 20 and the memory card 1 will be explained below. Because this is necessary for the explanation of the performance curve used for specifying a performance parameter.

The host 20 divides the memory area into a unit calling 16 kB recording unit (RU) to write data such as video data for each RU. Specifically, the RU (write unit area) is equivalent to a unit written by a one-time multi-block write command.

For example, the RU is the same as a cluster defined by an SD™ file system, or has a size of integer multiples of the cluster. The unit of the RU may be set as 32 kB, 64 kB, 128 kB, etc.

Figure 9:
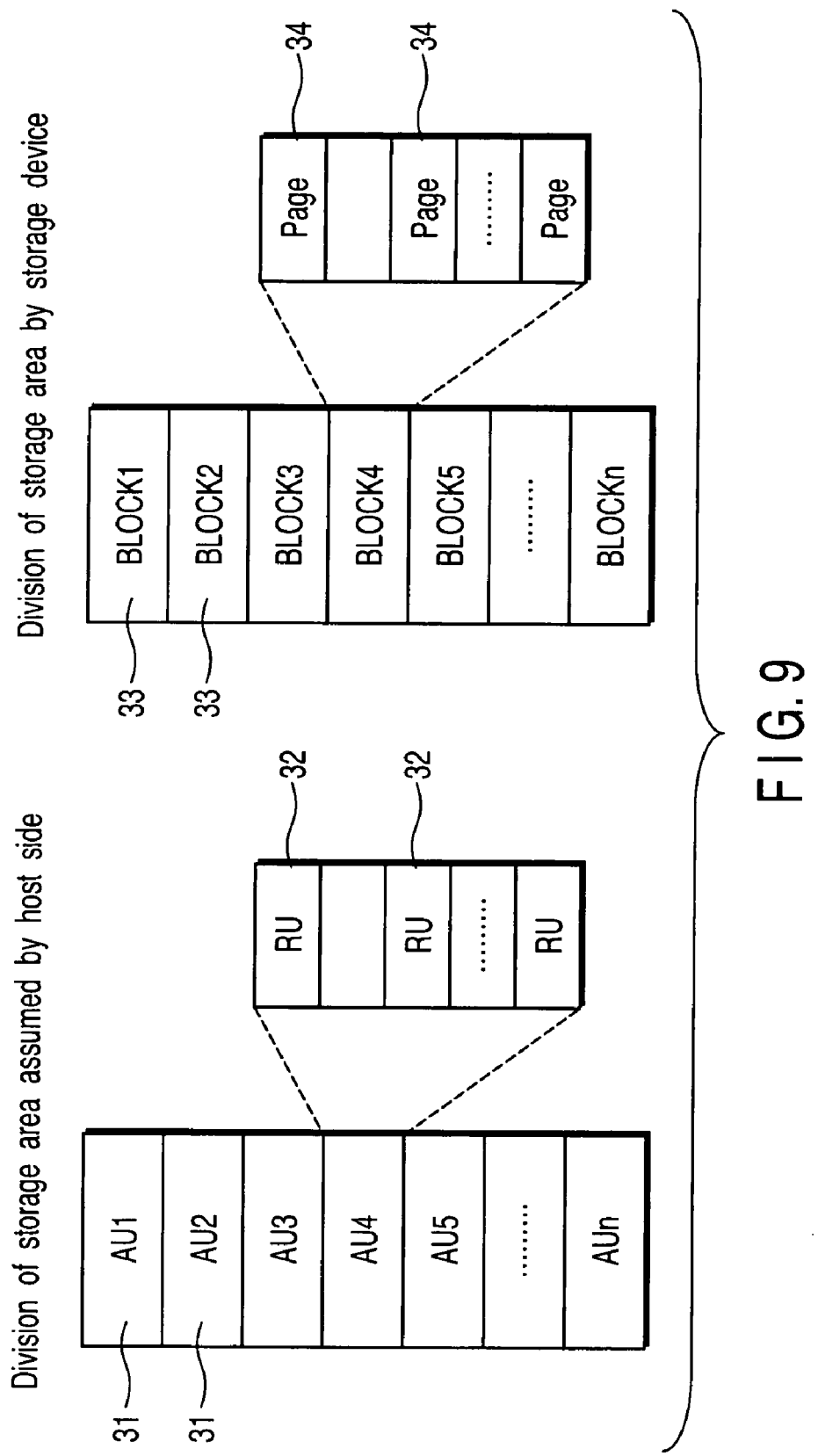
FIG. 9 is a diagram showing an outline of area division of a storage device, and storage area division inside the storage device when viewed from a host apparatus side.

FIG. 9 shows the division of the memory area of the flash memory 3 assumed by the host 20, and the actual division of the memory area by the memory card 1. The left side of FIG. 9 corresponds to division of the memory area assumed by the host 20. On the other hand, the right side of FIG. 9 corresponds to actual division of the memory area by the memory card 1.

As seen from FIG. 9, an RU 32 is a memory unit when viewed from the host 20. An allocation unit (AU) 31 is defined as a set of several RUs 32. The AU (management unit area) is a management unit, and is defined as a unit used for dividing all memory area of the memory card 1 into an AU size $S_{AU}$.

The page 34 and the RU 32 have no need of corresponding with each other. The RU 32 may be set to integer multiples of the page 34. Likewise, the Au size $S_{AU}$ is integer multiples of the RU size. The AU 31 may be set to integer multiples of the block 33.

[5-1-2] How to Determine Performance Curve

The performance curve will be described below with reference to FIG. 10 giving the following case as an example. Namely, the host 20 successively writes RU unit data from the position A to the position B in the memory area.

Typically, the area from A to B corresponds to the AU 31. In the following description, data is newly written into the AU including used RU 31 as an example. As shown in FIG. 10, a logic address of the AU 31 is set as LA. When data is newly written to each RU 32 of the AU 31, the following work is actually required. First, data in RU(s) 32 (shown by "Used" in FIG. 10) which holds data in the existing physical block PAA is written into RU(s) 32 of another physical block PAB. Next, new write data must be written thereto. Then, the physical block PAB is newly mapped onto the logic address LA.

Time of newly writing data to RU 32 (shown by "Free" in FIG. 10) which initially holds no data corresponds to write time. The write time is defined as write performance Pw.

On the other hand, when already written data is copied to another RU 32, time is taken to read data from the old RU 32 (e.g., RU 32a) in addition to time of writing data to the RU 32 (e.g., RU 32b) of the new physical block PAB.

When the used RU 32 exists in the old physical block PAA, the used RU 32 is skipped and data is written into a free RU 32 (e.g., RU with "Data 3"). Data in the used RU 32 need to be written into destination RU 32 (e.g., RU 32b) before new data is written. Write of new data is stopped while the data in the used RU 32 is moved. Time spent for the operation is defined as data move performance Pm. Thus, the total time spent for writing new data is the sums of the total write time and the total move time.

From the foregoing explanation, when average performance P(Nu) is formularized, the following mathematical expression 1 is obtained.

$$[\text{Mathematical expression 1}]$$

$$\begin{aligned} P(Nu) &= [Sc \times (Nt - Nu)] / \\ &\quad [Sc \times (Nt - Nu) / \\ &\quad Pw + Sc \times Nu / Pm] \\ &= [(Nt - Nu) \times Pm \times Pw] / \\ &\quad [(Nt - Nu) \times Pm + Nu \times Pw] \end{aligned}$$

where,

Sc: Size of RU

Nt: Total number of RUs successively written from A to B (Number of RUs forming AU)

Nu: Number of used RUs between A and B (number of used RUs included in AU)

Pw: Write performance (unit: MB/sec)

Pm: Move performance (unit: MB/sec)

The write performance Pw varies depending on program time of the memory card 1 (flash memory 3). Moreover, the write performance Pw is defined as the lowest value of an average of the performance when write is continuously executed to all RUs 32 of AU 31 which consists of free RUs 32.

The move performance Pm is defined as the lowest value of an average move performance. The move performance Pm is calculated as an average when continuous RUs 32 are moved to form one completed AU 31. The move time is defined on the side of the back-end. If the memory card 1 has no need of moving the RU 32, the move performance Pm is defined as being infinite. This is expressed as "1/Pm=0".

Moreover, the move performance Pm varies depending on read time described later and data move in addition to the program time of the flash memory 3.

The following two values are defined when it comes to read performance.

1) Read Performance with Respect to Data

Read performance with respect to data (hereinafter, referred to as read performance) Pr is defined as the lowest value of an average of performance when reading data by RU 32 at random. The average may be calculated based on 256-time random reads by the RU 32. Moreover, the worst case should be considered in the time spent for making corrections using an error correcting code (ECC) with respect to each block 33. The read performance Pr must be larger than or at least equal to the write performance Pw 2) Read Time of File System (FAT)

Read time $T_{FR}$(4 kB) of file system such as a file allocation table (FAT) is defined as the maximum time when reading a 4 kB FAT. In this case, FAT read must be possible during AU write. This is because, considering the case of real time recording, the host 20 must read out FAT between AU writes. Moreover, the worst case should be considered in the time spent for making corrections using an ECC with respect to each block 33. FAT read time with respect to file system size (FR size) $S_{FR}$ is expressed using CEIL function as follows.

FAT read time with respect to file system size $$S_{FR}[kB]: T_{FR}(S_{FR}) = \left\lceil \frac{S_{FR}}{4 \text{ kB}} \right\rceil \cdot T_{FR}(4 \text{ kB})$$

⌈x⌉ represents the CEIL function which converts decimal fraction x to the smallest integer more than or equal to x.

Figure 11:
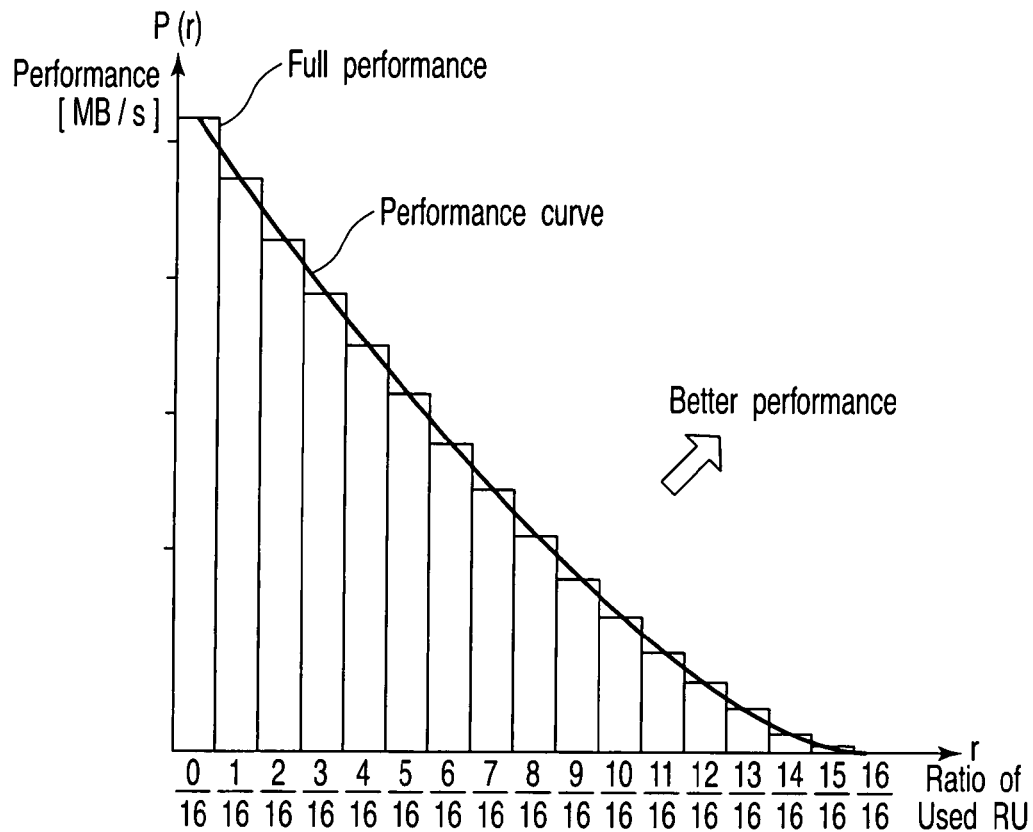
FIG. 11 is a diagram showing a performance curve according to the embodiment of the present invention.

FIG. 11 shows the performance of the memory card 1 calculated according to the mathematical expression 1. In FIG. 11, there is shown the performance when the number Nt of RUs 32 forming the AU 31 is set as 16.

As seen from FIG. 11, performance (vertical axis) is determined for each used RU ratio r (horizontal axis). Then, the performance of each used RU ratio r is connected, and thereby, a performance curve is obtained.

The performance curve is specified using the write performance Pw and the move performance Pm. The write performance Pw is equivalent to full performance when the used RU ratio r=0.

The used RU ratio r is expressed as the following mathematical expression using the number of Nt of RUs 32 of the AU 31 and the number Nu of used RUs 32.

$r=Nu/Nt$

This equation is also expressed as follows.

$Nu=r \times Nt$

The used RU ratio r varies in a range from 0 to 1. When r=0, this means that all RUs 32 are unused. On the other hand, when r=1, this means that all RUs 32 are used, that is, performance is 0; in other words, P(1)=0 is given.

It can be seen that any performance curves passes through the point (1, 0). When rewriting the mathematical expression 1 using "r", the following mathematical expression 2 is obtained.

Average performance curve: $P(r)=[(1-r) \times Pw \times Pm]/[r \times Pw+(1-r) \times Pm]$ [Mathematical expression 2]

Where, $0 \leq r \leq 1$

The performance is plotted using the expression 3, and thereby, the performance curve shown in FIG. 11 is obtained.

[5-2] Parameter Relevant to File System Update during Recording

File system update is inserted into the write sequence, and thereby, general (actually obtained) write performance decreases. For this reason, the host 20 requires parameters relevant to file system update when calculating the performance of the memory card 1 as described later. The host 20 can calculate the reduction of actual performance by the influence that the file system update is inserted into the write sequence.

Figure 12:
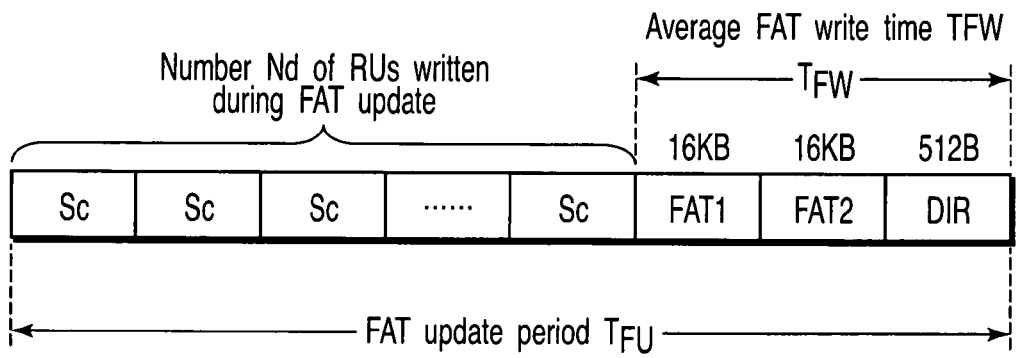
FIG. 12 is a diagram showing an example of file system update during recording in real time according to the embodiment of the present invention.

FIG. 12 shows a typical sequence of file system update during real time recording. In the following description, FAT is used as a typical example of the file system.

The update of the file system (FAT) possibly occurs after any write to RUs 32. FAT is periodically updated. The number of RUs 32 written between certain file system update and the next file system update is specified by file system update period $T_{FU}$. The number of RUs 32 written between the file system updates is Nd.

A FAT write cycle comprises three write operations. In FIG. 12, FAT1 and FAT2 denote FAT information write to FAT1 and FAT2 using one multi-block write command, respectively. File system (FAT) write may be started from arbitrary byte address, and may be defined as write ranging from 16 kB to arbitrary length.

In FIG. 12, DIR denotes Directory Entry. The DIR is generated prior to recording, and write is made to only 512 B portion having change directory entry. File system write time $T_{FW}$ is defined as the total time of file system write cycle, that is, the total write time of the FAT1, FAT2 and DIR. The file system write time $T_{FW}$ changes depending on the specifications of the controller 4.

[5-2-1] Conditions of Measuring an Average of File System Write Time $T_{FW}$

The File system write time $T_{FW}$ is defined as a value obtained from the average of some measuring values. The following mathematical expression 3 is used for specifying average file system write time $T_{FW}$(ave.). As seen from the following mathematical expression 3, the worst value of the average value of arbitrary eight-time file system write cycles is used as the average file system write time $T_{FW}$(ave.)

Average file system write time: $(T_{FW}(\text{ave.}))=[\max (T_{FW}(1)+T_{FW}(2)+\ldots T_{FW}(7)+T_{FW}(8))]/8$ [Mathematical expression 3]

[5-3] Operation Sequence of Host when Executing Real-Time Recording and Requirements

[5-3-1] Operation Sequence of Host when Executing Real-Time Recording

When executing real-time recording, the host 20 carries out a write operation while executing calculations according to the following sequence using the performance curve, class and parameters. Preferably, the host 20 carries out the following sequence when executing real-time recording.

(1) Determine performance (hereinafter, referred to as application performance) Pa requested from application included in the host 20.

(2) Select a proper number Nd of write RUs between file system updates.

(3) Determine a card performance Pc required for realizing the application performance Pa, considering file system update.

(4) Determine the maximum used RU ratio r(Pc).

(5) Classify AU 31 into $AU_{fast}$ and $AU_{slow}$.

(6) Estimate available record time $T_{rec}$.

(7) Adjust the number Nd of RUs written between file system updates. When the number Nd of RUs written between file system updates is larger, performance improves.

(8) When sufficient performance and sufficient available record time are not obtained after these calculations, card erase is required.

The specific method of carrying out the operations (1) to (8) and the requirements of the host 20 will be described below.

[5-3-2] Performance Calculation Method with File System Update

A typical file system (FAT) update cycle sequence in real time recording is as shown in FIG. 12. It is preferable that the host 20 carries out the sequence in the file system update.

[5-3-2-1] Card Performance Conditions Considering File System Update

The host 20 determines the card performance Pc required for satisfying Pa from the application performance Pa and average file system write time $T_{FW}$. As described above, the file system write sequence is inserted, and thereby, the total write performance worsens. Thus, the host 20 requires a card giving a card performance Pc higher than the application performance Pa in general.

The application performance Pa and card performance Pc required for satisfying Pa (hereinafter, card performance) are expressed by the following mathematical expressions 6 and 7, respectively.

Performance requested by application: $Pa=(Sc \times Nd)/(Sc \times Nd/Pc+T_{FW})$  [Mathematical expression 4]

Card performance Pc required for satisfying Pc: = $(Sc \times Nd \times Pa)/(Sc \times Nd - Pa \times T_{FW})$  [Mathematical expression 5]

The card performance Pc varies depending on the number Nd of write RUs between file system updates. As seen from FIG. 12, the number Nd of write RUs between file system updates varies depending on a frequency of file system update. Thus, the frequency of file system update affects the card performance Pc. The method of determining the frequency of file system update will be described in the following [5-3-2-2].

[5-3-2-2] Condition of File System Update Period

File system (FAT) update time (from file system update to next file system update) is determined by inserting file system write sequence in data transfer. Therefore, the file system update period depends on write speed; however time accuracy is not important. A simple method may be employed so that the host 20 simply calculates the file system update period. The file system update period is expressed using the following mathematical expression 6.

File system update period:  [Mathematical expression 6]

$$T_{PF} = Sc \times Nd / Pa$$
$$= Sc \times Nd / Pc + T_{FW}(ave.)$$

The host 20 may adjust the number of RUs written between file system updates considering a reduction of card performance resulting from file system write. In this case, the file system update period $T_{PF}$ is preferably one second or more.

When a larger number of RUs is selected, the card performance Pc approaches the application performance Pa. By doing so, the memory card 1 having low performance is capable of satisfying the application performance Pa.

[5-3-3] Classification of Allocation Unit (AU)

The host 20 determines which AU 31 is available for real time recording. In other words, host 20 determines whether or not each AU 31 satisfies the requested card performance Pc. The performance of each AU 31 changes depending on the used RU ratio as seen from FIG. 11. Therefore, each AU 31 is determined using the used RU ratio as a threshold value.

[5-3-3-1] Maximum Used RU Ratio

Figure 10:
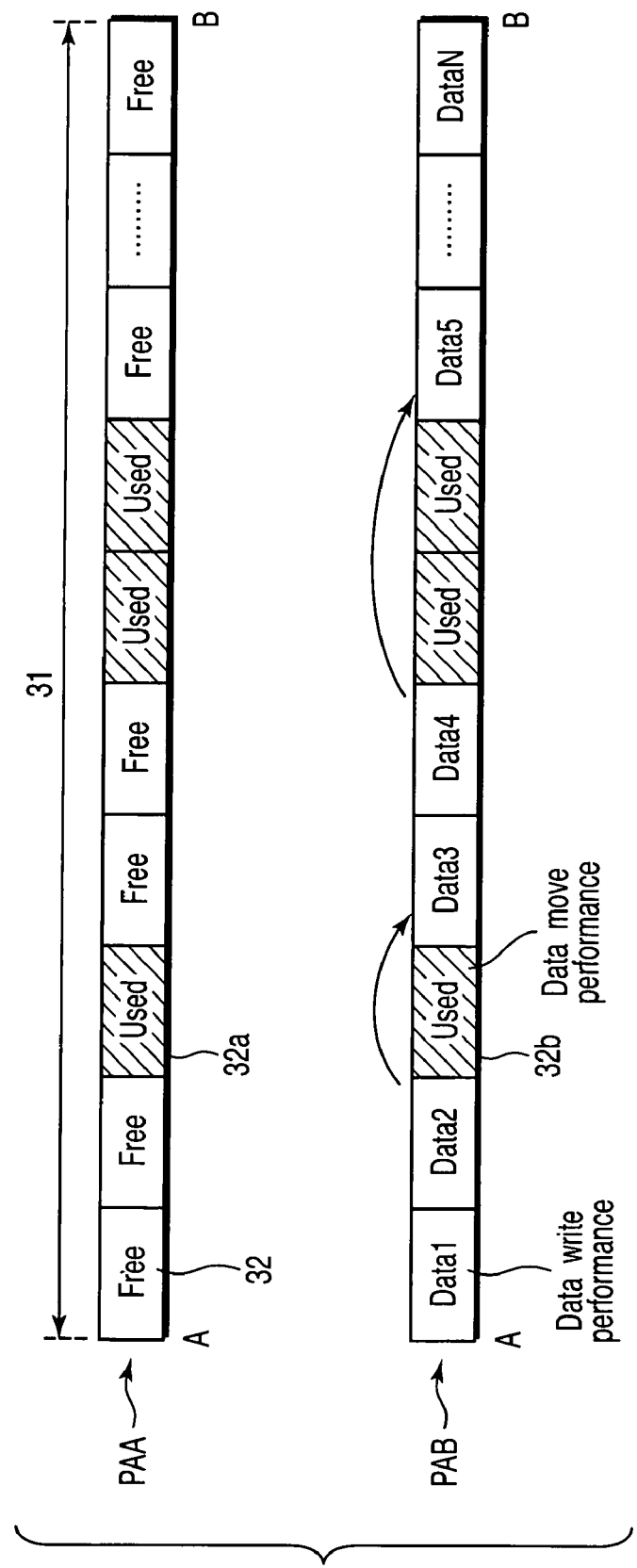
FIG. 10 is an explanatory view showing movement of data according to the embodiment of the present invention.

As shown in FIG. 10, if the write start position A and the write end position B are at the boundary of the AU 31, the performance of the AU 31 is calculated using mathematical expression 2.

Thus, it is possible to lead the maximum used RU ratio r(Pc) from the card performance Pc as the inverse function of mathematical expression 2.

AU 31 having a used RU ratio r less than the maximum used RU ratio r(Pc) is an AU 31 satisfying the card performance Pc. The smaller used RU ratio r the AU 31 has, the more suitable to real time recording. The AU 31 is classified into $AU_{fast}$ and $AU_{slow}$ using the maximum used RU ratio r(Pc) as the boundary, as described below.

The maximum used RU ratio r(Pc) is expressed using the following mathematical expression 7.

Maximum used RU ratio: $r(Pc)=[(Pw-Pc) \times Pm]/[(Pw-Pm) \times Pc + Pw \times Pm]$  [Mathematical expression 7]

[5-3-3-2] Classification of AU into Two Categories

The host 20 classifies the AU 31 into two categories. One is $AU_{fast}$ (adaptive management unit area). This AU 31 has a rate sufficient to executing real-time recording with the card performance Pc. Another is $AU_{slow}$ (non-adaptive management unit area). This AU 31 is not suitable to real-time recording because the memory area is too fragmented.

The host 20 counts the number Nu of used RUs for each AU 31, and thereafter, calculates a used RU ratio r from the number Nu of used RUs. It is determined whether the AU is $AU_{fast}$ or is $AU_{slow}$ using the following mathematical expression 8.

If $Nu/Nt < r(Pc)$, AU is $AU_{fast}$

If $Nu/Nt \geq r(Pc)$, AU is $AU_{slow}$  [Mathematical expression 8]

Specifically, if (number Nu of used RUs)/(total number Nt of RUs in AU) is less than the maximum used RU ratio r(Pc), AU is classified as $AU_{fast}$. On the other hand, if the Nu/Nt is equal to or more than the maximum used RU ratio r(Pc), AU is classified as $AU_{slow}$.

Figure 13:
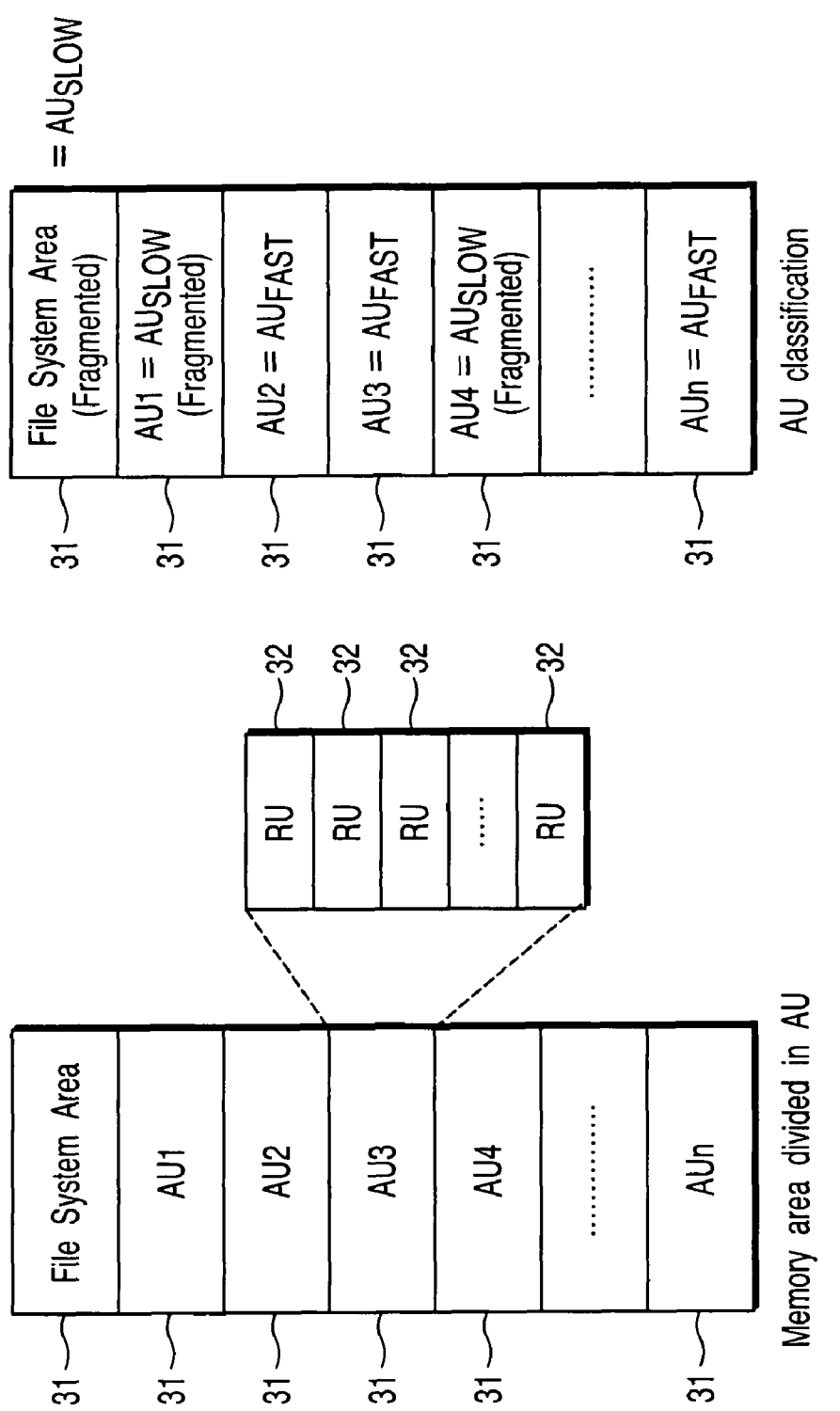
FIG. 13 is a diagram showing an example of AU classification with respect to a memory area according to the embodiment of the present invention.

FIG. 13 shows allocation of the AU 31 in the memory area, and shows distribution in the two kinds of memory area of the AU 31. The uppermost AU 31 includes file system; for this reason, it is an area, which is not suitable to real time recording. Therefore, the uppermost AU 31 is classified as $AU_{slow}$. Moreover, directory entry should not be created in the AU 31 recording data.

AU1 and AU4 do not include file system; however, it is determined that they are too fragmented because the (number Nu of used RUs)/(total number Nt of RUs in AU) is more than the maximum used RU ratio r(Pc).

[5-3-4] Available Record Time

The host 20 can calculate available time for real time recording using the following mathematical expression 9. In the expression, Nr represents the number Nr of available RUs 32 of all AUs 31 determined as $AU_{fast}$. If sufficient available record time is not prepared, the host 20 gives users instructions to transfer recorded data to another place, or reformats the memory card 19.

Available record time: $T_{REC}=Sc \times Nr/Pa$  [Mathematical expression 9]

The host 20 again calculates the available record time when it sets the number Nd of write RUs between file system updates, that is, file system update period $T_{PF}$ larger. This is because larger number Nd of RUs between file system updates improves the performance. In other words, the maximum used RU ratio r(Pc) value is increased and the number of $AU_{fast}$ increases; therefore, available record time increases.

The erasure block size does not necessarily have to be the size of a NAND Flash™ memory chip. That is, a set of sizes may be used as the unit.

Another address in the BPB has been allocated to the flag indicating the flash device, but an ID type of media descriptor (media ID) indicating a media type may be additionally allocated.

In the embodiment, parameters such as flash device flag (FDF), erasure block size (EBS), write page size, recording unit (RU) size, allocation unit (AU) size, write performance Pw, and data move performance Pm are stored in the BPB of FAT. However, this method does not limit the embodiment. More specifically, these parameters may be stored in an area other than BPB of the boot sector in a file system (file format) which is different from the FAT file system.

The example of the FAT file system has been described, but the present invention is also applicable to another file system having a similar file access system.

Note that in the format process and write process described above in the embodiment, a program which can be executed by a computer may be stored and distributed in storage mediums such as magnetic discs (floppy (registered trademark) disc, hard disk, etc.), optical discs (CD-ROM, DVD, etc.), magnetic optical discs (MO), and semiconductor memories.

Moreover, the storage medium may have any storage form as long as the storage medium can store the program and can be read by the computer.

Furthermore, a part of each process for realizing the present embodiment may be executed by middleware (MW) or the like such as an operating system (OS) operated on the computer based on an instruction of the program installed from the storage medium to the computer, database management software, or network software.

In addition, the storage medium is not limited to a medium which is independent of the computer, and also includes a storage medium in which the program transmitted via LAN, internet or the like is downloaded and stored or temporarily stored.

Moreover, the number of the storage mediums is not limited to one, a case where the process in the present embodiment is executed from mediums is also included in the storage medium, and a medium constitution may have any constitution.

It is to be noted that the computer executes each process in the present embodiment based on the program stored in the storage medium, and may have any constitution such as a device constituted of one personal computer or the like, a system in which a plurality of devices are connected via a network or the like.

Moreover, the computer is not limited to the personal computer, and includes a calculation process device included an information process apparatus, a microcomputer or the like, and an apparatus or a device which can realize a function of the present invention according to the program is generically referred to as the computer.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general invention concept as defined by the appended claims and their equivalents.

What is claimed is:

1. A file storage device, comprising:
   a memory which is accessed by a file system of a host apparatus, the memory having a user data area which is accessible by the file system and in which a flash device flag indicating whether the memory is a nonvolatile semiconductor memory or not is written, wherein the host apparatus checks the flash device flag and if the flash device flag indicates that the memory is the nonvolatile memory, the host apparatus reads block size information indicating a size of an erasure block from the nonvolatile semiconductor memory.

2. The device according to claim 1, wherein the device information is written into a boot sector in the user data area.

3. The device according to claim 1, wherein data in the memory is erased by the erasure block, and
   the block size information indicating the size of the erasure block is written in the user data area.

4. The device according to claim 3, wherein the block size information is written in a boot sector in the user data area.

5. The device according to claim 1, wherein data is written by write page into the memory, and
   page size information indicating a size of the write page is written in the user data area.

6. The device according to claim 5, wherein the page size information is written in a boot sector in the user data area.

7. The device according to claim 1, wherein
   data is written by write page into the memory,
   the memory receives a write command by a write unit which comprises write pages from a host apparatus which access the memory,
   the memory is managed by the host apparatus by management unit which comprises write pages,
   performance parameter information is written in the user data area,
   the performance parameter information includes at least one of a size of the write unit, a size of the management unit, a write performance which indicates how fast the memory writes data, and how fast the memory moves data within the memory.

8. The device according to claim 7, wherein the performance parameter information is written in a boot sector in the user data area.

9. A host apparatus into which a file storage device having a nonvolatile semiconductor memory whose data is erased by erasure block is inserted, the nonvolatile semiconductor memory having a user data area which is accessible by a file system which manages data of the nonvolatile semiconductor memory, the host apparatus comprising:
   a file system controller configured to logically format the nonvolatile semiconductor memory in accordance with the file system, to read a flash device flag and information of a size of the erasure block from the file storage device, and to write the flash device flag and the information of the size of the erasure block into the user data area during logical format.

10. The host apparatus according to claim 9, wherein the block size information is written in a boot sector in the user data area.

11. The host apparatus according to claim 9, wherein the nonvolatile semiconductor memory writes the data by write page, and
   the file system controller is further configured to read information of a size of the write page from the file storage device, and to write the page size information which indicates the size of the write page into the user data area during logical format.

12. The host apparatus according to claim 11, wherein the page size information is written in a boot sector of the user data area.

13. A method of formatting a memory in which data is written by write page and erased by erasure block and which has a user data area accessible by a file system, the method comprising:
reading a flash device flag and information of a size of the erasure block from the nonvolatile semiconductor memory; and
writing the flash device flag and a block size information which indicates the size of the erasure block in the user data area in accordance with the file system.

14. The method according to claim 13, wherein the block size information is written in a boot sector of the user data area.

15. The method according to claim 13, further comprising:
reading information of a size of the write page from the nonvolatile semiconductor memory; and
writing the page size information which indicates the size of the write page in the user data area.

16. The method according to claim 15, wherein the page size information is written in a boot sector of the user data area.

17. A method of writing data in a memory in which data is erased by erasure block which comprises write areas, and in which erasure block size information indicating a size of the erasure block is stored in a user data area which is accessible by a file system, the method comprising:
reading, from the user data area, a flash device flag indicating whether the memory is a nonvolatile semiconductor memory or not;
reading the erasure block size information from the user data area, when the flash device flag indicates that the memory is the nonvolatile semiconductor memory; and
writing data in the write areas in accordance with the erasure block size information.

18. The method according to claim 17, wherein each of the write areas includes a first area in which data is written and a second area in which write completing information indicating that the data is written in the first area is written, and
writing data in the write areas includes writing the write completing information in the second area which is included in the write area including the first area in which the data is written, while writing data in the first area.

19. The method according to claim 18, further comprising:
searching, from erasure blocks, for a non-written block in which the write completing information is not written, with reference to a file system to manage data of the nonvolatile semiconductor memory, the erasure block size information, and the write completing information, wherein
writing the data in write areas includes writing the data preferentially from the write areas in the non-written block when the non-written block is found.

* * * * *